(12) United States Patent
Yin et al.

(10) Patent No.: US 12,542,929 B2
(45) Date of Patent: Feb. 3, 2026

(54) SIGNALING OF PRIORITY PROCESSING ORDER FOR METADATA MESSAGING IN VIDEO CODING

(71) Applicant: Dolby Laboratories Licensing Corporation, San Francisco, CA (US)

(72) Inventors: Peng Yin, Ithaca, NY (US); Sean Thomas McCarthy, San Francisco, CA (US); Walter J. Husak, Simi Valley, CA (US); Konstantinos Konstantinides, Saratoga, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 158 days.

(21) Appl. No.: 18/567,333

(22) PCT Filed: Jun. 27, 2022

(86) PCT No.: PCT/US2022/035087
§ 371 (c)(1),
(2) Date: Dec. 5, 2023

(87) PCT Pub. No.: WO2023/278302
PCT Pub. Date: Jan. 5, 2023

(65) Prior Publication Data
US 2024/0283978 A1    Aug. 22, 2024

Related U.S. Application Data

(60) Provisional application No. 63/216,318, filed on Jun. 29, 2021.

(51) Int. Cl.
*H04N 19/70* (2014.01)

(52) U.S. Cl.
CPC .................................. *H04N 19/70* (2014.11)

(58) Field of Classification Search
CPC ...................................................... H04N 19/70
USPC ...................................................... 375/240.12
See application file for complete search history.

(56) References Cited

U.S. PATENT DOCUMENTS

| 9,241,158 | B2 | 1/2016 | Wang |
| 9,270,989 | B2 | 2/2016 | Hannuksela |
| 9,380,317 | B2 | 6/2016 | Wang |
| 9,479,782 | B2 | 10/2016 | Wang |
| 9,521,393 | B2 | 12/2016 | Wang |
| 9,648,322 | B2 | 5/2017 | Wang |

(Continued)

FOREIGN PATENT DOCUMENTS

| RU | 2633100 C2 | 10/2017 |
| WO | 2014011569 A1 | 1/2014 |

(Continued)

OTHER PUBLICATIONS

Husak et al., "AHG9: Thoughts on SEI messages," Joint Video Experts Team (JVET) of ITU-T SG 16 WP 3 and ISO/IEC JTC 1/SC 29 , JVET-V0113 , 22nd Meeting, by teleconference , Apr. 20-28, 2021 , pp. 1-2.

(Continued)

*Primary Examiner* — Amir Shahnami

(57) ABSTRACT

Methods, systems, and bitstream syntax are described for determining the processing order of metadata messaging, such as supplemental enhancement information (SEI) messaging in MPEG video coding.

11 Claims, 3 Drawing Sheets

(56) References Cited

U.S. PATENT DOCUMENTS

| | | | |
|---|---|---|---|
| 10,244,249 | B2 | 3/2019 | Ramasubramonian |
| 10,397,595 | B2 | 8/2019 | Fröjdh |
| 2022/0060752 | A1* | 2/2022 | Pettersson ............... H04N 19/65 |

FOREIGN PATENT DOCUMENTS

| | | |
|---|---|---|
| WO | 2014058598 W | 4/2014 |
| WO | 2017044740 A2 | 3/2017 |
| WO | 2020130922 A1 | 6/2020 |
| WO | 20230278302 W | 1/2023 |

OTHER PUBLICATIONS

Yin et al., "AHG9: SEI processing order SEI message," Joint Video Experts Team (JVET) of ITU-T SG 16 WP 3 and ISO/IEC JTC 1/SC 29, JVET-AA0102-v2, 27th Meeting, by teleconference, Jul. 13-22, 2022, pp. 1-8.

Bross B. et al., "Versatile Video Coding (Draft 10)," JVET-S2001, 131. MPEG Meeting, Jun. 29, 2020-Jul. 3, 2020, Motion Picture Expert Group or ISO/IEC JTC1/SC29/WG11, retrieved on http://phenix.int-evry.fr/mpeg/doc_end_user/documents/131_Teleconference/wg11/m54716-JVETS2001-v8-JVET-S02001-v8.zip JVET-S02001-v8.docx.

Y-K Wang et al., "AHG9: On the scalability dimension information SEI message," 22. JVET meeting; Apr. 20, 2021-Apr. 28, 2021, Teleconference, The Joint Video Exploration Team of ISO/IEC JTC1/SC29/WG11 and ITU-T SG.16, Apr. 13, 2021.

Advanced Video Coding, Rec. ITU-T H.264, Jun. 2019, ITU.

High Efficiency Video Coding, Rec. ITU-T H.265, Nov. 2019, ITU.

H-M Oh (LGE) et al: "Supplemental enhancement information set SEI message," 28. JCT-VC Meeting; Jul. 15, 2017-Jul. 21, 2017; Torino; (Joint Collaborative Team on Video Coding of ISO/IEC JTC1/SC29/WG11 and ITU-T SG.16 ), No. JCTVC-AB0036, Jul. 18, 2017, pp. 1-5.

JVET-V0113, "Thoughts on SEI messages", JVET online meeting, Apr. 2021.

Rickard Sjoberg et al., "Overview of HEVC High-Level Syntax and Reference Picture Management," IEEE Transactions on Circuits and Systems for Video Technology ( vol. 22, Issue: 12, Dec. 2012), pp. 1858-1870, Oct. 5, 2012.

Versatile supplemental enhancement information messages for coded video bitstreams, Rec. ITU-T H.274, Aug. 2020, ITU.

Versatile Video Coding, Rec. ITU-T H.266, Aug. 2020, ITU.

* cited by examiner

SIGNALING OF PRIORITY PROCESSING ORDER FOR METADATA MESSAGING IN VIDEO CODING

CROSS-REFERENCE TO RELATED APPLICATIONS

This application is a U.S. National Stage application under U.S.C. 371 of International Application No. PCT/US2022/035087, filed on Jun. 27, 2022, which claims the benefit of priority from U.S. Provisional Patent Application No. 63/216,318, filed on Jun. 29, 2021, which is incorporated by reference.

TECHNOLOGY

The present document relates generally to images and video. More particularly, an embodiment of the present invention relates to signaling a priority processing order for metadata messaging (e.g., supplemental enhancement information (SEI) messaging) in images and video sequences.

BACKGROUND

As described in Annex D of the AVC and HEVC standards, or in H.274 (also referred to as VSEI) (Ref. [1-4]), Supplemental Enhancement Information (SEI) messages in a coded video bitstream assist in processes related to decoding, display, or other purposes in a video processing pipeline. Despite their extensive use, at least up to now, conforming decoders (e.g., an AVC, HEVC, or VVC decoder) are not required to process any SEI messaging to comply with any of the MPEG video coding standards (such as AVC, HEVC, and VVC).

In a typical video bitstream, multiple SEI messages may co-exist; however, none of the existing video coding standards define the processing order of such messaging. For some SEI messages, outside of information embedded in syntax elements, there is no specific processing defined in the standards. Examples of such messages include SEI messaging defining a mastering display color volume or content light-level information. For some other SEI messages, such as those describing film grain characteristics (FGC) or color remapping information, in addition to the syntax elements, additional post-processing may also be defined. For the later, the final video output may vary depending on the processing order of these SEI messages. As appreciated by the inventors, improved techniques for signaling the priority of SEI messaging are described herein.

The term "metadata" herein relates to any auxiliary information transmitted as part of the coded bitstream and assists a decoder to render a decoded image. Such metadata may include, but are not limited to, color space or gamut information, reference display parameters, and film grain modeling parameters, as those described herein. While examples presented herein may refer to SEI messaging as it relates to MPEG-based video coding standards, a person of ordinary skill would appreciate that the techniques discussed herein are applicable to any such metadata messaging and any audio or video coding format (e.g., AV1 and the like).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Example embodiments that relate to priority processing of metadata are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

Summary

Example embodiments described herein relate to signaling of a priority order processing of metadata (such as SEI messaging) in video coding. In an embodiment, a processor receives an input video bitstream and corresponding input metadata messages defining supplemental processing to be applied to decoded video pictures of the input video bitstream;

parses the input metadata messages to identify a processing order of metadata messaging (POM) message defining a preferred processing order of selected input metadata messages; and upon detecting the POM message:

extracts information determining a total number of the selected input metadata messages with a priority processing order;

extracts identity and priority information of the selected input metadata messages with a priority processing order; and for a decoded video picture of the input video bitstream, applies two or more of the selected input metadata messages with their determined priority processing order.

In another embodiment, a processor:

generates a video bitstream and corresponding metadata messages defining supplemental processing to be applied to decoded video pictures of the video bitstream;

generates a processing order of metadata (POM) message defining a preferred processing order of selected metadata messages, wherein the POM message comprises:

information determining a total number of selected input metadata messages with a priority processing order;

identity and priority information of the selected input metadata messages with the priority processing order; and generates an output stream that includes the video bitstream, the metadata messages, and the processing order of metadata message.

In another embodiment, tangible computer media include a bitstream comprising:

encoded video pictures;

input metadata messages defining supplemental processing to be applied to decoded video pictures of the input bitstream; and a processing order of metadata messaging (POM) message defining a preferred processing order of selected input metadata messages, wherein the POM message comprises:

information determining a total number of the selected input metadata messages with a priority processing order;

identity and priority information of the selected input metadata messages with a priority processing order.

Examples of SEI Messaging Flow Processing

Figure 1A:
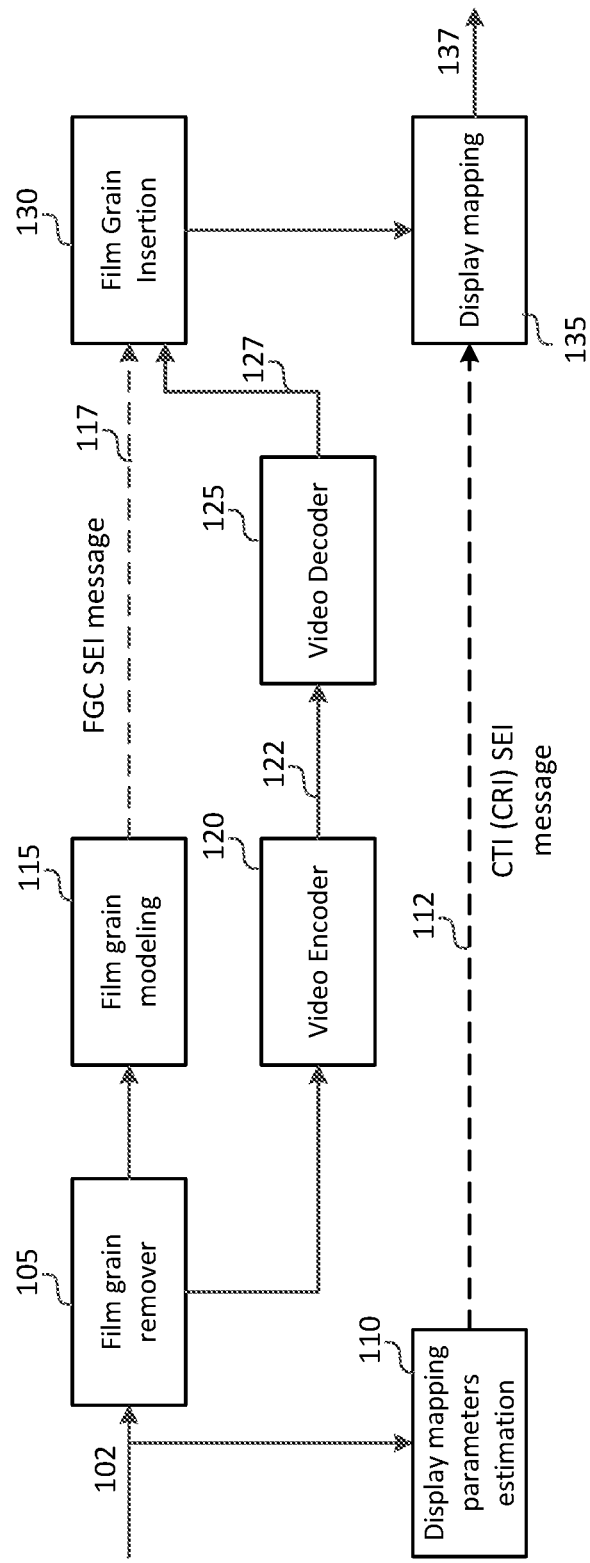
FIG. 1A and FIG. 1B depict examples of video processing pipelines when metadata includes multiple SEI messages and their post-processing order may affect video output.
Figure 1B:
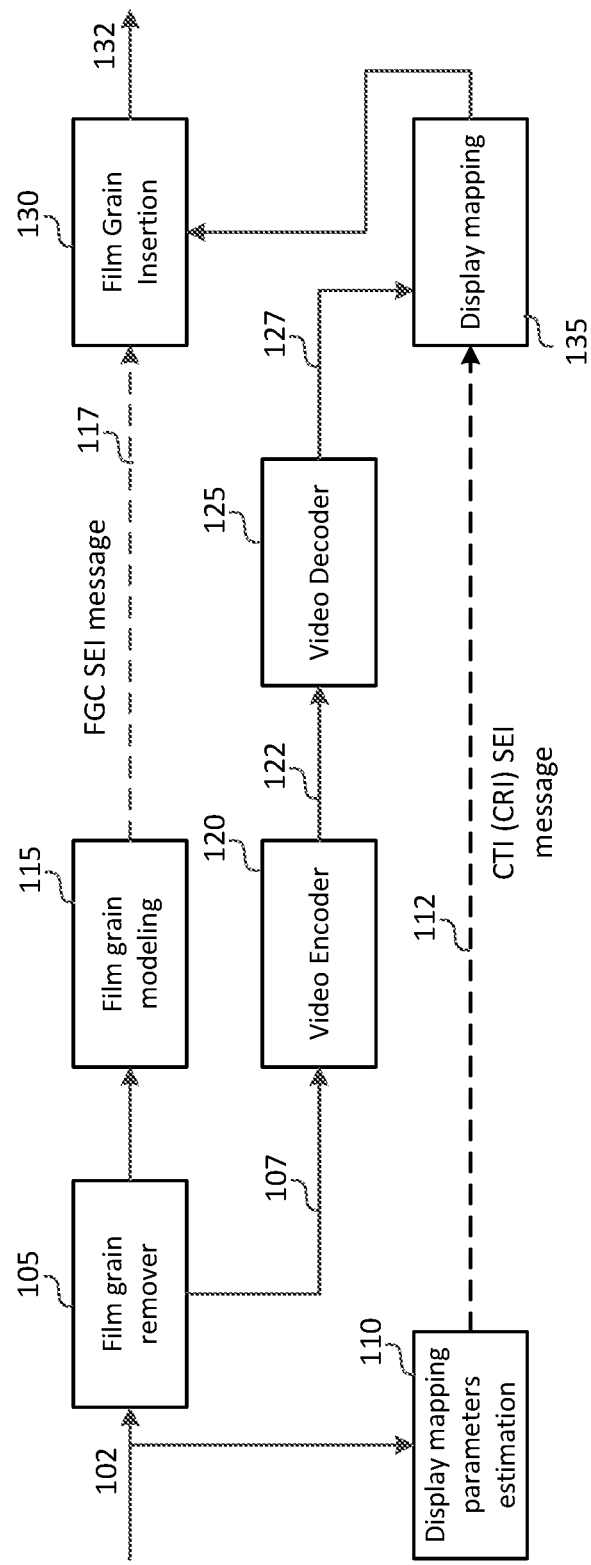

In reference to existing video coding standards, as in AVC, HEVC and VVC (Refs. [1-4]) (collectively to be referred to as MPEG or MPEG video standards), FIG. 1A and FIG. 1B depict example processing pipelines when the SEI messaging includes messaging related to both film grain characteristics (FGC) and color remapping information (CRI) or color transform information (CTI).

As depicted in FIG. 1A and FIG. 1B, given input video 102, an encoder may generate two sets of SEI messages: a) CTI/CRI SEI metadata (112) related to preferred display parameters (e.g., as generated by block 110), and b) film grain characteristics (117) to be added to a decoder, to emulate film grain that was removed by the encoder (e.g., by block 105), to improve coding efficiency, and modeled by a film grain modeling block (115). Thus, video encoder (120) compresses the output of the film-grain remover (107) to generate a compressed bitstream 122. The compressed bitstream 122 and the metadata (112 and 117) are transmitted to a decoder.

As depicted in FIG. 1A, after decoding (125), the decoded output (127) is passed to a film-grain insertion unit 130, which generates and adds film grain noise using the information embedded in the FGC metadata (117). The output of the film grain insertion unit (130) is then passed to a display mapping unit 135, which best maps the dynamic range and color gamut of the input stream to a target display by using the information embedded in the CRI/CTI metadata (112). The output is signal 137.

As depicted in FIG. 1B, after decoding (125), compared to FIG. 1A, the order of processing the two sets of metadata is reversed. Now, the decoded output (127) is processed first by the display mapping unit 135, which maps the dynamic range and color gamut of the decoded stream to the target display by using the information embedded in the CRI/CTI metadata (112). Next, the output of display mapping unit is passed to the film-grain insertion unit 130, which generates and adds film grain noise using the information embedded in the FGC metadata (117), and generates output video 132.

Because of the different ordering of display mapping and film-grain addition, it is expected that video outputs 132 and 137 will be different, especially if the target display differs significantly from the intended display, therefore it is deemed important to specify in the bitstream the proper order of processing metadata so that a decoder output matches as close as possible the creative intent of the content creators.

Examples for Signaling Priority Order in SEI Messaging

Example embodiments presented herein relate to specifying the processing order among multiple metadata sets when multiple SEI messages co-exists in the video coding standards, such as in AVC, HEVC and VVC. In particular, high level syntax (HLS) is proposed to specify such an order. Such high-level syntax can be inserted at a variety levels of the coded bitstream, say, without limitation, at the video parameter set (VPS), the picture parameter set (PPS), the sequence parameter set (SPS), an auxiliary parameter set (APS), a picture header (PH), as separate SEI messaging, and the like.

In an embodiment, such high level syntax should include the following information: 1) what SEI messages might exist in the coded video stream (CVS); 2) whether processing order is relevant to a particular SEI message; and, 3) if relevant, what is the processing order of the particular SEI messages.

The processing (or priority) order of an SEI message may be specified in a variety of ways, such as: 1) an absolute order; for example, in one embodiment, a message with a smaller processing/priority order needs to be processed earlier than one with a larger priority order, 2) a relative order: in one embodiment, the processing order may be specified as a dependency on the processing order of another SEI message. When a coding standard defines processing certain metadata as mandatory in the decoding process, the processing order of such SEI message should always be specified. If a conformance point of certain SEI message is defined, then the processing order of such SEI message should also be specified.

Table 1 depicts an example to specify processing order among SEI messages. In this example, an "SEI messaging processing order" SEI message, a proposed new SEI message, may specify which SEI messages are part of the CVS where processing order matters, and their processing priority order. The SEI messages of interest are identified through their unique payload type (see Refs [1-4]).

TABLE 1

| SEI processing order SEI message | |
|---|---|
| sei_processing_order( payloadSize ) { | Descriptor |
|   po_num_sei_msg_types | u(16) |
|   for( i = 0; i < num_sei_msg_types; i++ ) { | |
|     po_sei_payload_type[ i ] | u(16) |
|     po_sei_order[ i ] | u(8) |
|   } | |
| } | | po_num_sei_msg_types specifies the number of types of SEI messages for which information is provided in the SEI processing order SEI message.

po_sei_payload_type[i] indicates the payload Type value of the i-th type of SEI message for which information is provided in the SEI processing order SEI message. The values of po_sei_payload_type[m] and po_sei_payload_type[n] shall not be identical when m is not equal to n.

po_sei_order[i] provides the absolute order of SEI messages with payload Type equal to po_sei_payload_type

[i]. The values of po_sei_order[m] and po_sei_order[n] shall not be identical when m is not equal to n. If the values of po_sei_order[m] is less than the values of po_sei_order[n], the SEI message with po_sei_payload_type[m] is processed before the SEI message with po_sei_payload_type[n]

In Table 1, instead of the absolute po_sei_order[i] parameter, in an embodiment, one could also describe a relative order, as in po_sei_rel_order[i][j], where the order of SEI message i is defined relative to the order of SEI message j. For example, po_sei_rel_order[3][1]=2, may define that the priority of SEI message "3" is the priority order of SEI message "1" plus (or, alternatively, minus) 2. In such a scenario, one can assume that all SEI messages with priority processing start at a default value (say, 1), and then they are adjusted accordingly.

In an embodiment, Table 1 can also be simplified by removing the po_sei_order[i] parameter. In such a scenario, the encoder already lists the po_sei_payload_type[i] values in an implied and predetermined priority (e.g., lowest to highest or highest to lowest). Such an approach forces a priority even if there is no such requirement (for example, SEI messages "2" and "4" could have the same priority but would be listed one after the other), thus limiting possible parallelization of SEI messaging-related tasks. The implicit order should be made when a new CVS starts, where all SEI messages that are present are listed.

The SEI manifest SEI message in HEVC and VVC conveys information on SEI messages that are indicated as expected (i.e., likely) to be present or not present in the bitstream; however, no priority among these SEI messages is indicated. Table 2 shows another example to extend the SEI manifest SEI and include priority information. The additional syntax, over the existing SEI manifest message, is shown in an italic font.

TABLE 2

Example 1 of extending the SEI manifest SEI message

| | Descriptor |
|---|---|
| sei_manifest( payloadSize ) { | |
|   manifest_num_sei_msg_types | u(16) |
|   for( i = 0; i < manifest_num_sei_msg_types; i++ ) { | |
|     manifest_sei_payload_type[ i ] | u(16) |
|     manifest_sei_description[ i ] | u(8) |
|     if (*manifest_sei_description*[ i ] = = 1) { | |
|       *manifest_sei_po_flag*[ i ] | *u(1)* |
|       if (*manifest_sei_po_flag[i]*) | |
|         *manifest_sei_order*[ i ] | *u(8)* |
|     } | |
|   } | |
| } | | manifest_sei_po_flag[i] equals to 1 specifies the SEI message with payloadType equal to manifest_sei_payload_type[i] requires processing order information. manifest_sei_po_flag[i] equals to 0 specifies the SEI message with payloadType equal to manifest_sei_payload_type[i] does not require processing order information.

manifest_sei_order[i] provides the absolute order on SEI messages with payloadType equal to manifest_sei_payload_type[i]. The values of manifest_sei_order[m] and manifest_sei_order[n] shall not be identical when m is not equal to n. If the values of manifest_sei_order[m] is less than the values of manifest_sei_order[n], the SEI message with manifest_sei_payload_type[m] is processed before the SEI message with manifest_sei_payload_type[n].

NOTE: as described earlier, if the processing order is defined implicitly (e.g., by the order SEI messages are listed in manifest_sei_po_flag[i]), then the syntax element manifest_sei_order[i] is not required and can be deleted.

Table 3 depicts an alternative approach to extend SEI manifest SEI supporting backward compatibility with legacy decoders already supporting older versions of the SEI manifest message.

TABLE 3

Example 2 of extending the SEI manifest SEI message

| | Descriptor |
|---|---|
| sei_manifest( payloadSize ) { | |
|   manifest_num_sei_msg_types | u(16) |
|   for( i = 0; i < manifest_num_sei_msg_types; i++ ) { | |
|     manifest_sei_payload_type[ i ] | u(16) |
|     manifest_sei_description[ i ] | u(8) |
|   } | |
|   if ( *more_data_in_payload* ( ) ) { | |
|     if ( *payload_extension_present*( ) ) { | |
|     for ( i = 0; i < manifest_num_sei_msg_types; i++ ) { | |
|       if (*manifest_sei_description*[ i ] = = 1) { | |
|         *manifest_sei_po_flag*[ i ] | *u(1)* |
|         if (*manifest_sei_po_flag[i]*) | |
|           *manifest_sei_order*[ i ] | *u(8)* |
|       } | |
|     } | |
|   } | |
| } | |
| } | |

From HEVC, more_data_in_payload( ) is specified as follows:
If byte_aligned( ) is equal to TRUE and the current position in the sei_payload( ) syntax structure is 8*payloadSize bits from the beginning of the sei_payload( ) syntax structure, the return value of more_data_in_payload( ) is equal to FALSE.
Otherwise, the return value of more_data_in_payload( ) is equal to TRUE.

From HEVC, payload_extension_present( ) is specified as follows:
If the current position in the sei_payload( ) syntax structure is not the position of the last (least significant, right-most) bit that is equal to 1 that is less than 8*payloadSize bits from the beginning of the syntax structure (i.e., the position of the payload_bit_equal_to_one syntax element), the return value of payload_extension_present( ) is equal to TRUE.
Otherwise, the return value of payload_extension_present( ) is equal to FALSE.

Table 3 allows existing decoders that implement the SEI manifest messaging to continue implementing it as in the past by ignoring the SEI processing order syntax. On the other hand, decoders implemented after the adoption of the new syntax may take advantage of the updated syntax and related processing ordering information.

As discussed in relation to Table 1, the processing order of SEI messages in Tables 2 and 3 may also be implied or can be defined relative to the processing order of other SEI messages.

In an embodiment, Table 1 and its semantics may be modified as depicted for the description of Table 4. In this embodiment the semantics depend on the syntax element MaxNumPayloadTypes to address the issue that the number of possible payload types varies across coding standards (e.g., as of this draft, there are 77 SEI messages for AVC, 67 for HEVC, and 39 for VVC), plus the actual number may also increase in future versions of a standard, and to discourage signaling more payloadTypes than could possibly exist.

Alternatively (or additionally), the actual valid payloadTypes for each standard could be specified as well in a specific list (say, list SeiAssociatedSeiList). For example, one could add this paragraph in the VVC or VSEI standards (Ref. [3-4]):

"Use of the SEI message processing order SEI message syntax

For purposes of interpretation of the SEI message processing order SEI message, the list SeiAssociatedSeiList is set to consist of the payloadType values 0, 1, 3, 4, 5, 19, 45, 47, 129, 130, 132, 133, 137, 142, 144, 145, 147 to 150, inclusive, 153 to 156, inclusive, 165, 168, 177, 179, 180, 200 to 208, inclusive."

In another embodiment, this list could be part of the SEI Processing order SEI message or other header information, modified by the encoder as needed.

TABLE 4

SEI processing order SEI message

| sei_processing_order( payloadSize ) { | Descriptor |
|---|---|
| po_num_sei_payload_types | u(16) |
| for( i = 0; i < num_sei_payload_types; i++ ) { | |
| po_sei_payload_type[ i ] | u(16) |
| po_sei_processing_order[ i ] | u(8) |
| } | |
| } | | po_num_sei_payload_types specifies the maximum number payloadType values for which syntax elements po_sei_payload_type[i] and po_sei_processing_order[i] are present. The value of po_num_sei_payload_types shall be less than or equal to the MaxNumPayloadTypes, which defines the maximum number of payloadType values.

Note: if the syntax element SeiAssociateSeiList is added, then the above definition can be replaced with:

po_num_sei_payload_types specifies the maximum number payloadType values for which syntax elements po_sei_payload_type[i] and po_sei_processing_order[i] are present, as specified by an encoder (e.g., via list SeiAssociateSeiList).

po_sei_payload_type[i] specifies the value of payloadType for the i-th SEI message. The value of po_sei_payload_type[m] shall not equal the value of po_sei_payload_type[n] when m is not equal to n.

Note: if the syntax element SeiAssociateSeiList is added, then add: The value of po_sei_payload_type[i] shall equal a payloadType value in SeiAssociateSeiList.

po_sei_order[i] indicates the preferred order of processing an SEI message with payloadType equal to po_sei_payload_type[i]. The value of po_sei_order[m] shall not equal the value of po_sei_order[n] when m is not equal to n. po_sei_order[m] greater than 0 and less than po_sei_order[n] indicates that any SEI message with payloadType equal to po_sei_payload_type[m] should be processed before any SEI message with payloadType equal to po_sei_payload_type[n]. po_sei_order[i] equal to 0 specifies that the preferred order of processing an SEI message with payloadType equal to po_sei_payload_type[i] is determined by external means not specified in this Specification.

Figure 2:
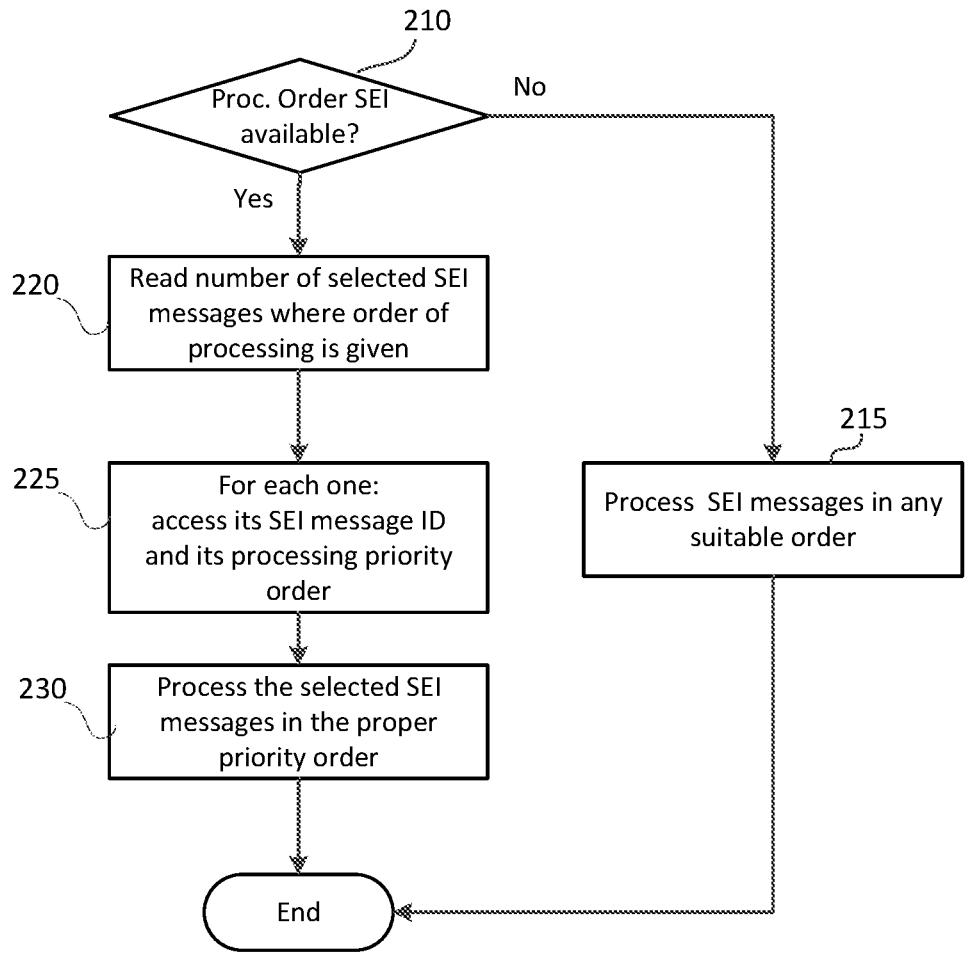
FIG. 2 depicts an example processing pipeline in a decoder when an SEI Priority Order of Messaging (POM) message is available according to an embodiment of this invention.

FIG. 2 depicts an example processing pipeline according to an embodiment when an SEI processing order of messaging (POM) message is available. Starting from step 210, a decoder may search SEI payloadTypes of incoming SEI messages to detect whether an SEI POM message is present. If there is no such message, processing (215) of SEI messaging continues without taking into consideration their order. If an SEI POM message is present, then in step 220, the decoder reads the number of selected SEI messages for which priority of processing is defined. Next, in step 225, for each such message, the decoder reads its identity (say, its payloadType) and its priority, typically an integer value with predetermined ordering significance (e.g., whether smaller numbers or larger numbers have higher priority). In an embodiment, priority may also be implied by the order of how the select SEI messages are listed. Finally, in step 230, the decoder processes these select SEI messages with their proper priority.

REFERENCES

Each one of the references listed herein is incorporated by reference in its entirety.

[1] *Advanced Video Coding*, Rec. ITU-T H.264, May 2019, ITU.

[2] *High Efficiency Video Coding*, Rec. ITU-T H.265, November 2019, ITU.

[3] *Versatile Video Coding*, Rec. ITU-T H.266, August 2020, ITU.

[4] *Versatile supplemental enhancement information messages for coded video bitstreams*, Rec. ITU-T H.274, August 2020, ITU.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signaling priority processing ordering for metadata messaging in video coding, such as those described herein. The computer and/or IC may compute any of a variety of parameters or values that relate to signaling priority processing ordering for metadata messaging in video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to signaling priority processing ordering for metadata messaging in video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted. Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to signaling priority processing ordering for metadata messaging in video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to determine priority processing among multiple metadata messages, the method comprising:
   receiving an input video bitstream and corresponding input metadata messages defining supplemental processing to be applied to decoded video pictures of the input video bitstream;
   parsing the input metadata messages to identify a processing order of metadata messaging (POM) message defining a preferred processing order of selected input metadata messages; and upon detecting the POM message:
      extracting information determining a total number of the selected input metadata messages with a priority processing order;
      extracting identity information and a corresponding priority information for each one of the selected input metadata messages defining the preferred processing order, wherein the priority information comprises an integer value with either smaller or larger numbers causing earlier processing in the preferred processing order, and wherein the integer value either expresses the priority of a selected input message in an absolute priority processing order among the selected input metadata messages or in a processing order relative to a second selected input metadata message among the selected input metadata messages; and for a decoded video picture of the input video bitstream, applying two or more of the selected input metadata messages with their determined priority processing order.

2. The method of claim 1, wherein the POM message is part of at least one of a slice header, a picture header, a sequence parameter set, a picture parameter set, a network abstraction layer unit header, and a supplemental enhancement information (SEI) message.

3. The method of claim 2, wherein the POM message is part of an SEI manifest message.

4. The method of claim 1, wherein extracting the identity and priority information of the selected input metadata messages with a priority processing order comprises reading a list of the total number of the selected input metadata messages with an implied decreasing priority processing order or an implied increasing priority processing order.

5. The method of claim 1, wherein the messaging identity information comprises a payloadType information in SEI messaging.

6. A method for transmitting a video bitstream from an encoder to a decoder, wherein generating the video bitstream in the encoder comprises:
   receiving video pictures and generating encoded video pictures;
   receiving input metadata messages defining supplemental processing to be applied to decoded video pictures of the video bitstream; and
   combining the encoded video pictures and the input metadata messages to generate the video bitstream, wherein the input metadata messages comprise
   a processing order of metadata messaging (POM) message defining a preferred processing order of selected input metadata messages, wherein the POM message comprises:
      information determining a total number of the selected input metadata messages with a priority processing order;
      identity information and a corresponding priority information for each one of the selected input metadata messages defining the preferred processing order, wherein the priority information comprises an integer value with either smaller or larger numbers causing earlier processing in the preferred processing order, and wherein the integer value either expresses the priority of a selected input message in an absolute priority processing order among the selected input metadata messages or in a processing order relative to a second selected input metadata message among the selected input metadata messages.

7. The method of claim 6, wherein the POM message is part of an SEI manifest message or an SEI processing order of metadata message.

8. The method of claim 7, wherein the identity information comprises a payloadType information in SEI messaging.

9. A method to specify priority processing among multiple metadata messages, the method comprising:
   generating a video bitstream and corresponding metadata messages defining supplemental processing to be applied to decoded video pictures of the video bitstream;
   generating a processing order of metadata (POM) message defining a preferred processing order of selected metadata messages, wherein the POM message comprises:

information determining a total number of selected input metadata messages with a priority processing order;

identity information and a corresponding priority information for each one of the selected input metadata messages defining the priority processing order, wherein the priority information comprises an integer value with either smaller or larger numbers causing earlier processing in the preferred processing order, and wherein the integer value either expresses the priority of a selected input message in an absolute priority processing order among the selected input metadata messages or in a processing order relative to a second selected input metadata message among the selected input metadata messages; and generating an output stream that includes the video bitstream, the metadata messages, and the processing order of metadata message.

10. A non-transitory computer-readable storage medium having stored thereon computer-executable instructions for executing with one or more processors a method in accordance with claim 1.

11. An apparatus comprising a processor and configured to perform the method recited in claim 1.

* * * * *